Patented Jan. 2, 1945

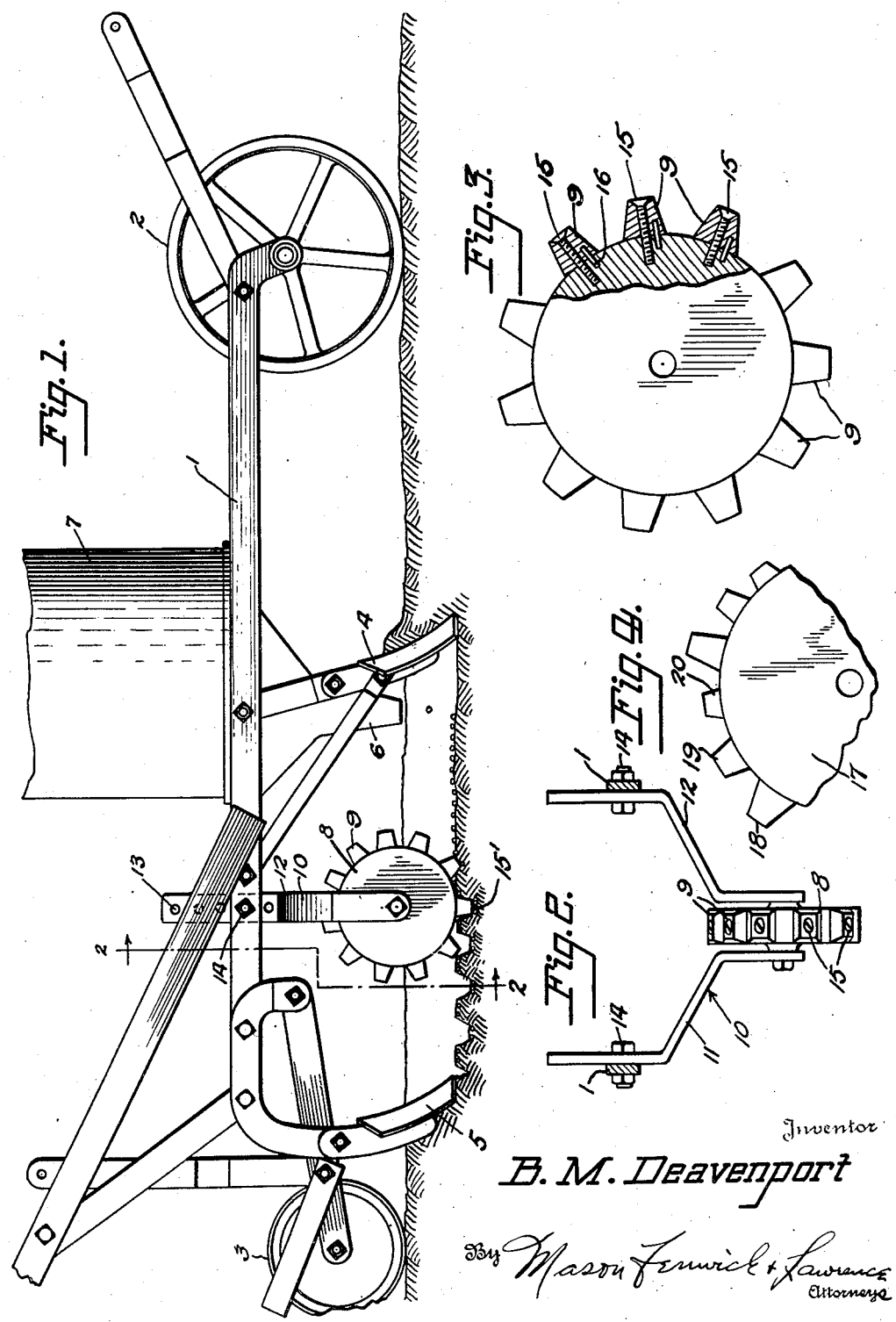

2,366,389

UNITED STATES PATENT OFFICE 2,366,389

TWO-DEPTH SEED PLANTER

Ben Matt Deavenport, Clarksdale, Miss., assignor of twenty-five per cent to Leonard L. Ledbetter and thirty per cent to Silvan Eugean Adams, both of Clarksdale, Miss.

Application August 24, 1943, Serial No. 499,838

1 Claim. (Cl. 111—71)

This invention relates to a two-depth seed planter and has for its general object the provision of a planter wherein means are provided at a point between the seed chute and covering shovels, working at the bottom of the furrow for positively engaging alternate short linear portions of the row of seeds deposited from the chute and pressing them into the soil to a definite greater depth than the intervening portions of the row of seeds.

An object of the invention is to provide the seed engaging element as an integral part of planters when manufactured, or as an attachment for planters.

Other objects of the invention will appear as the following description of a preferred and practical embodiment thereof proceeds.

In the drawing, throughout the several figures of which the same reference characters have been employed to denote identical parts:

Figure 1 is a side elevation of a planter embodying the principle of the invention;

Figure 2 is a vertical section taken along the line 2—2 of Figure 1;

Figure 3 is a side elevation partly in section, of a two-depth planting wheel;

Figure 4 is a fragmentary side view of a planting wheel, capable of planting seed to three depths.

The germination of certain crops, of which cotton is a notable example, is critically dependent upon weather conditions, including humidity, and upon conditions of soil incident thereto. Thus, if all the seed are planted to the same depth below the overlying soil surface, a spell of untoward weather may cause complete or partial failure of germination, resulting in crop loss.

It has long been known that this hazard can be minimized by planting the seed at different depths. If seed at lower depth are drowned out by abnormally high water table, the soil moisture may be just right for the shallower planted seeds. Conversely if drought prevents the germination of the seeds which are nearer the surface, there may be sufficient soil moisture for the proper germination of the deeper planted seeds.

Devices are known which permit planting the seeds at two depths. These operate by making a furrow having a longitudinally undulating bottom upon which the seed are freely dropped, some landing on the elevations and some in the valleys of the furrow. This method of planting has the disadvantage that some of the seed dropped on the elevations will gravitate down the sides of the elevations and congregate in the valleys so that the row will not be evenly planted, the greater portion of the seed being planted at the greater depth.

By the subject invention the planter makes a flat bottomed furrow upon which the row of seeds are uniformly dropped, whereupon, the two-depth mechanism engage short alternate portions of the row of seeds, positively pressing the engaged seeds depthwise to a uniform depth below the bottom of the furrow, and either leaving the remaining short alternate portions of the row of seeds unengaged, resting upon the bottom of the furrow, or preferably, positively pressing them to a uniform and less depth below the bottom of the furrow.

Referring now in detail to the several figures, the planter illustrated is typical of any conventional form of planter to which the subject invention may be applied, and comprises a frame 1 supported upon the wheels 2 and 3, the latter preferably tracking the path of the furrow and compacting the soil upon the planted seeds. A furrow opening shovel 4 and furrow closing shovels 5 are carried by the frame in longitudinally spaced relation and the seed chute 6 leading from the seed hopper 7 is so mounted as to drop the seeds in a row upon the bottom of the furrow immediately behind the furrow opening shovel 4. It will be understood from the above description that the shovel 4 operates to produce a furrow of constant depth so that the row of seeds is deposited at a constant depth below the surface of the ground.

The seed planting mechanism in its specific form comprises a wheel 8 so mounted with respect to the frame as to track in the furrow, and to operate between the seed chute and the closing shovels. The wheel is provided with the peripheral spaced teeth 9 and is normally set at such depth as to tractively engage the bottom of the furrow whereby the wheel rotates as the planter travels in a forward direction. The wheel 8, as shown, is journaled in bearings in a two-armed bracket 10, the arms 11 and 12 of which are secured to the frame 1. The shape and construction of the bracket 10 is immaterial to the invention, and varies according to the structure of the planter frame to which it is attached. For purpose of providing depthwise adjustment of the wheel 8, the arms 11 and 12 are provided with a series of bolt holes 13 which may be selectively engaged by the bolts 14 which secure the bracket in a frame 1.

The width of the wheel 8, the radial dimensions of the teeth 9, the circumferential dimensions of said teeth as well as their width in a transverse direction are all matters of choice.

The two-depth planting wheel 8 is normally set at such depth that the teeth 9 embed themselves in the soil at the bottom of the furrow as the wheel rotates. The teeth thus engage short linear portions of the row of seeds which lie freely upon the bottom of the furrow and press the seeds of said portions to a determined even depth below the bottom of the furrow, as indicated at 15' in Figure 1. The working depth of the wheel 8 may be set so that the remaining alternate portions of the row of seeds which come between adjacent teeth are not touched by the planter wheel, but remain at the level of the bottom of the furrow. However, it is generally preferred to set the wheel at such depth that the seed which come between the teeth 9 are engaged by the planter wheel sufficiently to press them at least compactly into the soil of the bottom of the furrow. If desired, the planter wheel may be set to a depth at which the seed engaged by the teeth 9, as well as the seed which come between said teeth, are pressed below the bottom of the furrow, but to two different depths. In the normal operation of the planter, the furrow is closed by the shovels 5 and the soil which covers the seed is substantially uniform, the covering soil being entirely unworked by the planter wheel 8 compacted by the pressure of the wheel 3.

Figure 3 shows that the teeth 9 may be separate from the planting wheel 8 and detachable therefrom so that broken or detached teeth may be replaced, or teeth of different dimensions substituted. Figure 3 shows that the teeth 9 may be secured by a single screw 15, in which case a small dowel 16 projecting from the wheel 8 and entering a hole in the tooth 9 may be employed to fix the teeth in proper transverse position.

While the invention is described as a two-depth planter or planter attachment, it is within the purview of the invention to plant the seeds at more than two depths, if desired, in which instance the peripheral teeth of the planter wheel may have different radial dimensions. Figure 4 shows a planting wheel 17 in which the peripheral teeth are arranged in recurring series of three, the teeth 18, 19 and 20 being of progressively decreasing radial height. The short alternate portions of the row of seeds dropped by the chute and engaged by these teeth will be pressed beneath the bottom of the furrow to three different depths.

It will be obvious that while the two-depth planting wheel, as shown and described, may be incorporated into the structure of planters at the time of their manufacture, it is equally applicable by changes which involve no more than mechanical skill, to be applied to planters as an attachment.

While I have in the above disclosure described what I believe to be a preferred and practical embodiment of the invention, it will be understood to those skilled in the art that other mechanisms than those shown may be employed to carry out the principles of the invention so that the specific illustrated form of the invention is not to be construed as limiting the scope of the invention which is defined in the terms of the appended claim.

What I claim is:

In a planter of the type having forwardly positioned means for opening a flat bottomed furrow of constant depth, a seed chute rearward of said furrow opening means operating to deposit a row of seeds longitudinally upon the bottom of said furrow as the planter moves forward, and means rearwardly of the seed chute for closing the furrow, a two-depth planting attachment adapted to be mounted on said planter between said chute and furrow closing means, comprising a wheel having a cylindrical portion and flat ended teeth projecting radially from said cylindrical portion in spaced relation, said wheel being rotated by traction of said teeth with the bottom of the furrow, said teeth being engageable with alternate short portions of the row of seeds deposited by said chute pressing them to a uniform depth below the bottom of said furrow, the faces of said cylindrical portion between the bases of the teeth being engageable with the other alternate portions of the row of seeds for pressing them to a shallower uniform depth below the bottom of said furrow, a support adapted to be secured to said planter, said wheel being journaled in the lower end of said support, and means for adjusting said support depthwise to vary the planting depth of both portions of the row of seeds, the depth distance between both portions being constant and equal to the height of the teeth.

BEN MATT DEAVENPORT.